Nov. 21, 1933.   J. ROBINSON   1,936,071
AUTOMATIC TRAIN PIPE CONNECTER
Original Filed Jan. 24, 1929   2 Sheets-Sheet 1
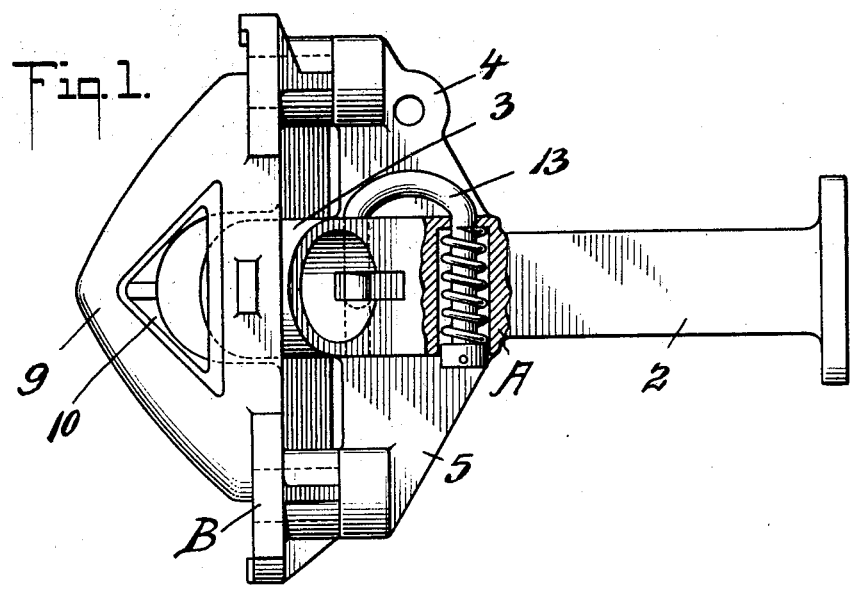
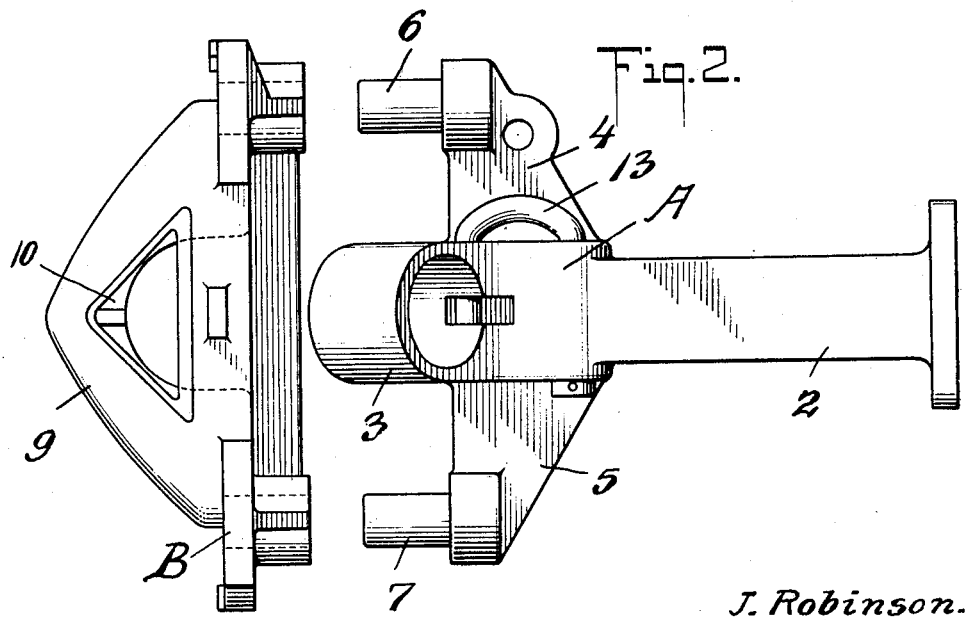
J. Robinson.
INVENTOR

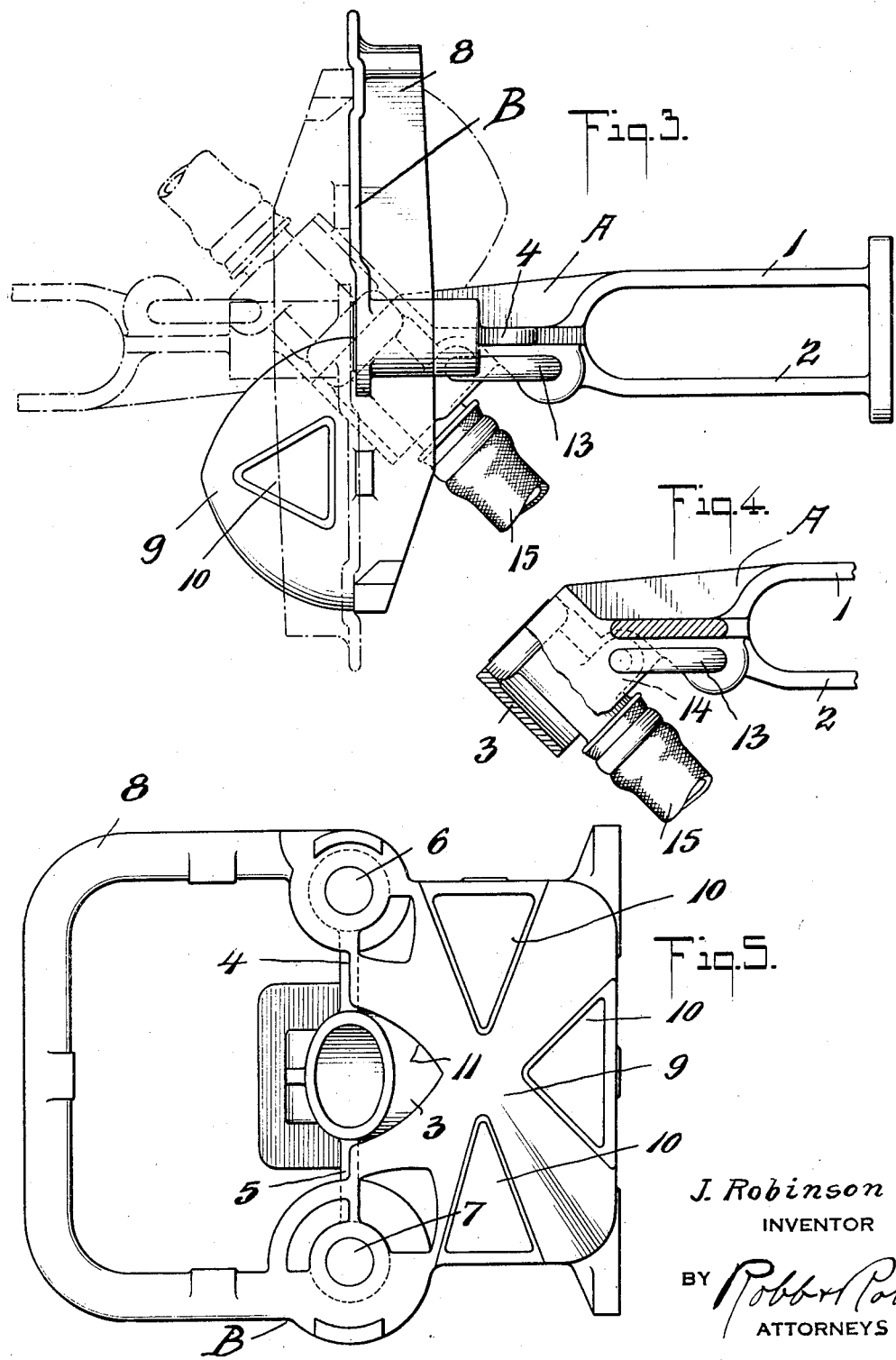

Patented Nov. 21, 1933

1,936,071

UNITED STATES PATENT OFFICE 1,936,071

AUTOMATIC TRAIN PIPE CONNECTER

Joseph Robinson, New York, N. Y.

Refiled for abandoned application Serial No. 334,789, January 24, 1929. This application October 5, 1932. Serial No. 636,343

7 Claims. (Cl. 285—58)

This invention has to do with the art of connecters of the class customarily known as automatic train pipe connecting devices designed for use upon passenger and freight cars for causing the automatic connection of one or more train pipes with which the rolling stock may be equipped.

A certain type of such connecters embodies a shank or stem adapted to be suitably connected with a supporting bracket usually carried by the regular car coupler universally provided upon railway cars, together with a coupler head which has been formed integrally with said shank or stem and is equipped with the devices that automatically guide mating coupling heads into coupled position in the operation of the automatic connecter.

Now, in the heretofore proposed construction of connecter of the kind to which I refer, the portion of the device at which the stem or shanks unites with the coupling head is formed with a nipple socket or opening for the reception of the nipple attached to the end of the train pipe or conduit, one of which is carried by each coupling head to the extent of being attached thereto.

Under practical conditions of operation, certain disadvantages have arisen in respect to the proper action of a connecter of the class which I have described. In the actual coupling of a pair of coupling heads, it is obvious that very considerable strains are received upon the head and shank parts, especially when the coupler is operative during movements of cars going around curves. More especially is this true when the curves cause considerable angularity in the relation of the cars to which the connecter heads are attached. The heads are frequently bent or sprung under the conditions stated, and on account of the distortion thus produced, the nipple sockets have been distorted and so bent or sprung as to practically prevent the detachment of the conduits from the heads to which they are associated. Moreover, the distortion or the bending of any portion of the coupling heads creates the liability of inaccuracy of action of the coupling elements which may be of the ring and cone type, or other types for that matter.

Now in the carrying out of my invention I have had in view the difficulties experienced in the practical operation of connecters of the class to which this invention relates and I have made certain improvements to eliminate the difficulties heretofore attendant upon the use of such connecters.

Another objection to the type of connecter members that has been referred to is the extreme difficulty in manufacturing such connecter heads which are made of castings. These castings are so complicated to form that they are very awkward to handle and expensive to manufacture, so that I have had this phase of their construction particularly in mind and have redesigned the connecter member to provide a two-part structure susceptible of ready assemblage, and the parts being adapted to be so easily cast separately that the objectionable manufacturing difficulties heretofore experienced are avoided.

In so far as the suggestions first referred to herein are concerned, my formation of the connecter member is such that I have provided a shank structure which primarily carries the nipple socket for the conduit connection, arranged as heretofore, in an oblique manner, with respect to the meeting face of the coupling head. The shank member in effect is formed with offstanding arms or straps equipped with projections to inter-engage with the coupling head part, and the nipple socket is so disposed that it does not directly receive the strains and stresses to which it has been subjected heretofore in the coupling operations, thus avoiding the liability of the bending or distortion of the socket portion as heretofore resulted.

In addition to the foregoing I have so designed my connecter that very little complication is involved in its structure as simplicity of design of such devices is highly to be desired in the art under all conditions.

While I have presented in the accompanying drawings a preferred embodiment of my invention, I wish it to be understood that the same may be modified quite materially and yet the principle of construction which I employ, availed of, the two primary points involved in this connection being to employ a two-part casting for each connecter member to simplify the manufacturing operation, and to utilize a structure wherein the nipple socket is relieved of the strains and stresses that may be set up in the entire coupling device as it has been heretofore proposed to be made, with resultant defective action that has been fully presented.

In the annexed drawings,

Figure 1 is a side elevation view of the preferred embodiment of my invention.

Figure 2 is a similar view to Figure 1 but showing the two-part structure of my connecter member more clearly.

Figure 3 is a top plan view of one of my connecter members, a corresponding member being illustrated in coupled position by dotted lines, and the arrangement of the oblique fluid conduits being quite clearly evident; also the locking means for holding the nipples in the sockets provided therefor.

Figure 4 is a fragmentary sectional view with parts broken away and showing more clearly the formation of the nipple socket with the shank or stem of the coupling member.

Figure 5 is a front elevation of one of my connecter members bringing out its construction quite clearly.

Similar reference characters refer to similar parts throughout the specification and the accompanying drawings, in which my invention is very briefly presented on account of its simplicity of structure.

Each coupling member made according to this invention embodies the shank or stem A, formed integrally at its forward end with a nipple socket 3 and preferably comprising at its rearward end spaced straps or side elements 1 and 2. The purpose of the parts 1 and 2 is known, in that these parts usually span the bracket of a standard form of support used for such devices and well known in the art. For this reason I have not illustrated said support but it will preferably permit of a wide range of angular movement of the device, at least a maximum movement of 90° in relation to the track upon which cars provided with my connecter travel. It will be observed that the shank A is equipped with the nipple socket 3 disposed obliquely and off-standing from the sides of the shank intermediate the members 1 and 2, collectively considered, and the member 3, are the arms 4 and 5. These arms 4 and 5 are integral with the shank preferably and are equipped with projections 6 and 7 of pin-like formation.

The foregoing describes a single casting structure that forms one part of my connecter member and may be readily manufactured without any unusual production problems whatever.

The second part of my connecter member is the coupling head per se, always a necessary adjunct of a device such as I have invented. This coupling head is of the ring and cone type that needs little description. It is quite within the purview of my invention that the coupling head itself may be of another or other types so long as it performs its proper guiding function to effect the necessary coupling action of my invention. Specifically speaking, the coupling head designated B is composed of the ring member 8 and the cone member 9. The ring member is designed to cooperate with a cone member of a mating head and the cone member 9 is designed to coact with the ring member of a mating head, all obvious to those versed in the art. It is to be observed that the coupling head B is equipped with openings at its upper and lower portions in which openings the projections or pin members 6 and 7 of the shank A are snugly received, to be permanently united and thus affixed to the shank to provide a substantially unitary body therewith.

Now it is clear that the ring and cone member is of a structure which may be readily produced so far as being cast is concerned, affording no unusual complications such as would be incurred if said member were a part of the shank as has heretofore been proposed. The coupling head cone member 9 is provided with usual openings 10 for the customary purposes, and a special opening 11 into and through which the nipple socket 3 of the shank is adapted to pass. I do not alter the customary arrangement of the nipple socket so far as its general disposition in the united body structure of my connecter member is concerned. It will be clear from Figure 4 that the nipple member has associated therewith a spring controlled U-shaped latch 13, which latch is adapted to engage and interlock with a lug 14 on the nipple provided at the associated end of the fluid conduit, 15, the fluid conduit being thus held in proper relation to the connecter member.

From the foregoing it will be observed that I have so arranged the nipple socket that it is not subjected to the stresses received directly by the head, which stresses are primarily transmitted to the shank through the arms 5 and 4 and the projections 6 and 7, and not through the nipple socket itself. The advantage in this construction is clear from the previous statement of the objects of my invention.

What I claim is:

1. In an automatic train pipe connecter of the class described, the combination of a shank having a nipple socket and provided with off-standing arms, and a coupling head with interlocking parts removably connecting the coupling head with said arms so that the head will be supported by the shank.

2. In an automatic train pipe connecter of the class described, the combination of a shank having a nipple socket member provided with off-standing arms, and a coupling head with interlocking parts removably connecting the coupling head with said arms so that the head will be supported by the shank, and means on the head to protect said member against stresses communicated to the head in coupling and service operations.

3. In an automatic train pipe connecter of the class described, the combination of a shank provided adjacent to one end with supporting means for association with a car bracket or the like, and provided at one end with a nipple socket member, off-standing arms carried by the shank, a coupling head having guiding means for facilitating inter-engagement of another coupling head therewith, means connecting the shank arms with the coupling head to unite the two parts in a body unit, the coupling head being provided with a clearance space for the shank and thus preventing stresses received by the coupling head from being transmitted to the nipple socket member.

4. In an automatic train pipe connecter of the class described, the combination of a shank having off-standing arms, pin-like projections extending from the arms in said shank substantially parallel with its axis, a coupling head comprising guiding parts and formed with openings to receive the projections of the shank, and a nipple socket member carried by the shank.

5. In an automatic train pipe connecter of the class described, the combination of a shank having off-standing arms, pin-like projections extending from the arms in said shank substantially parallel with its axis, a coupling head comprising guiding parts such as usually provided and formed with openings to receive the projections of the shank, a nipple socket carried by one of the shank or head parts, and a U-shaped nipple locking member associated with the nipple socket for attaching a conduit nipple to said socket.

6. In an automatic train pipe connecter of the class described, the combination of a shank provided with offstanding arms, a coupling head with interlocking parts removably connecting the coupling head with said arms to maintain said shank and head against relative movement so that the head will be supported by the shank, and a nipple socket carried by the shank having its axis disposed obliquely at an angle of substantially 45° to the axis of the shank.

7. In an automatic train pipe connecter of the class described, the combination of a shank provided adjacent to one end with supporting means for association with a car bracket or the like, and provided at one end with a nipple socket, the axis of which is disposed at an angle of substantially 45° to the axis of the shank, off-standing arms carried by the shank, a coupling head having guiding means for facilitating inter-engagement of another coupling head therewith, means connecting the shank arms with the coupling head to unite the two parts in a body unit, the coupling head being provided with a clearance space in the form of an opening in the coupling head through which the nipple socket is adapted to pass.

JOSEPH ROBINSON.